United States Patent
Kraus et al.

(10) Patent No.: US 9,622,420 B2
(45) Date of Patent: Apr. 18, 2017

(54) AGRICULTURAL BALER PLATFORM

(71) Applicant: DEERE & COMPANY, Moline, IL (US)

(72) Inventors: Timothy J Kraus, Blakesburg, IA (US); Henry D Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 213 days.

(21) Appl. No.: 14/333,540

(22) Filed: Jul. 17, 2014

(65) Prior Publication Data

US 2016/0014969 A1    Jan. 21, 2016

(51) Int. Cl.
| | | |
|---|---|---|
| *A01F 15/08* | (2006.01) | |
| *A01D 85/00* | (2006.01) | |
| *A01D 90/08* | (2006.01) | |

(52) U.S. Cl.
CPC ........ *A01F 15/0883* (2013.01); *A01D 85/005* (2013.01); *A01D 90/08* (2013.01); *A01D 2085/007* (2013.01)

(58) Field of Classification Search
CPC .... A01D 90/08; A01D 90/083; A01D 85/005; A01D 2085/007; A01D 90/12; A01D 85/00; A01D 87/127; A01D 59/00; A01F 15/0883; A01F 2015/0808; A01F 15/106; A01F 15/0875; A01F 2015/074; B65B 61/28
USPC .......................................... 414/111, 489, 491
See application file for complete search history.

(56) References Cited

U.S. PATENT DOCUMENTS

| | | | | |
|---|---|---|---|---|
| 2,419,824 A | * | 4/1947 | Davis ....................... | B60P 1/36 198/318 |
| 2,520,458 A | * | 8/1950 | Doherty ............... | A01D 85/005 296/50 |
| 2,534,558 A | * | 12/1950 | Ottenbacher ............. | B60P 1/04 414/489 |
| 4,310,275 A | | 1/1982 | Hoelscher | |
| 4,549,840 A | * | 10/1985 | Ansbjer ............... | A01D 90/083 198/744 |
| 4,844,675 A | * | 7/1989 | Strosser ............... | A01D 85/005 280/656 |
| 5,211,345 A | * | 5/1993 | Siebenga ............. | A01D 87/127 119/57.91 |

(Continued)

FOREIGN PATENT DOCUMENTS

| | | |
|---|---|---|
| AU | 2003262343 A1 | 6/2005 |
| EP | 0983720 A1 | 3/2000 |

(Continued)

OTHER PUBLICATIONS

European Search report in foreign counterpart application No. 15176761.3 dated Dec. 15, 2015 (6 pages).

*Primary Examiner* — Glenn Myers

(57) ABSTRACT

An agricultural baler comprising a baler mechanism and a carriage assembly coupled to the baler mechanism. A platform is coupled to at least one of the baler mechanism and the carriage assembly. The platform is configured to move a bale from the baler mechanism to the carriage assembly and remain tilted until the bale is moved onto the carriage assembly at least substantially out of contact with the platform. A sliding mechanism is coupled to the carriage assembly. The sliding mechanism is configured to move the bale onto the carriage assembly.

15 Claims, 13 Drawing Sheets

(56) References Cited

U.S. PATENT DOCUMENTS

| | | | |
|---|---|---|---|
| 5,842,823 A | 12/1998 | Kohnen et al. | |
| 6,053,685 A | 4/2000 | Tomchak | |
| 6,171,047 B1* | 1/2001 | Vandervalk | A01D 87/126 |
| | | | 414/111 |
| 6,764,274 B2* | 7/2004 | Maclay | A01D 87/126 |
| | | | 414/111 |
| 6,851,908 B2* | 2/2005 | Bergen | A01D 85/005 |
| | | | 414/111 |
| 7,000,533 B2 | 2/2006 | Derscheid et al. | |
| 7,401,547 B2 | 7/2008 | Degen | |
| 8,261,512 B2* | 9/2012 | Gette | A01F 15/071 |
| | | | 100/15 |
| 2014/0144119 A1* | 5/2014 | Olander | A01F 15/106 |
| | | | 56/341 |

FOREIGN PATENT DOCUMENTS

| | | |
|---|---|---|
| FR | 2679410 A1 | 1/1993 |
| GB | 2204826 A | 11/1988 |
| JP | 2003143927 A | 5/2003 |
| PL | 158422 B1 | 9/1992 |

* cited by examiner

AGRICULTURAL BALER PLATFORM

FIELD OF THE DISCLOSURE

The present disclosure relates generally to crop harvesting systems. More particularly, the disclosure relates to an agricultural baler. Specifically, the disclosure relates to a platform apparatus to move a bale produced by an agricultural baler.

BACKGROUND OF THE DISCLOSURE

A cut and raked crop that has been dried or otherwise prepared in a field, such as hay, straw or other agricultural material is often gathered, compressed and shaped by an agricultural baler. There are several types of balers that are commonly used, each resulting in different types of bales. Some are rectangular and some are cylindrical of various sizes. Bales can be bound with netting, strapping, wire or traditionally twine using a tie system to connect ends of the twine. Large square balers often use a double tie knotting system or double tie knotter. The double tie knotter ties two knots, one to complete the previous bale, and another to start the next or current bale. Twine is then directly fed out of the twine spools during bale formation. A typical large square bale weighs between 800 and 1,600 pounds and is often dropped in the field by the baler for later retrieval, as the baling system proceeds though the field.

A baler that produces small rectangular bales, often also called square bales, produce bales that are typically wrapped with two strands of knotted twine. The bales are light enough for easy handling and typically weigh from 40 to 80 pounds each. A bale is formed by a series of processes performed by the square baler including lifting the windrowed material, hereinafter referred to as hay, by way of the pickup portion of the baler. The hay is then moved by way of an auger into a chamber that has a feeding fork. The feeding fork moves the hay in front of a sliding plunger with a cutting edge that cuts the hay and moves the hay in the chamber into previously packed hay therein causing the hay to be compressed. Once a predetermined amount of hay has been gathered in the chamber, as measured by the amount being extruded through the opening at the rear of the chamber, a mechanism is triggered causing the twine to be threaded through the hay, cut and then knotted thereby forming the bale and one portion of the twine is retained to start to receive hay for the next bale. As the bales are moved through the compression channel out to the rear of the baler, the baled hay is then often loaded onto a wagon, dropped into the field for later retrieval or moved to a towed bale accumulator.

Round balers rotate gathered crop material until a sufficiently large enough cylinder-shaped "round" or "rolled" bale is formed and that bale is secured with twine or wrapping. The back of the baler swings open, allowing the bale to be discharged. Variable-chamber balers typically produce bales from 48 to 72 inches in diameter and up to approximately 62 inches in width. The bales can weigh from 1,000 to 2,200 pounds, depending upon size, material, and moisture content.

Crop accumulators are known which group the bales while the baling operation is underway. When the crop accumulator is full, it is common to dump the harvested crop in the location where it is full. For example, a crop accumulator, which looks somewhat like a trailer is connected directly behind the baler and may collect and transport three round bales, allowing groupings of up to four bales at a time (counting the bale in the baler). These type of crop accumulators, accumulate the bales in a sequential manner relative to the general direction of travel of the baler. The crop accumulator may have a floor chain system in order to move the bale that it receives from the baler to a sequential position on the accumulator. These crop accumulators may, depending upon the load distribution, produce either an upward or downward force at the connection point of the baler, which thereby imparts a moment or torque on the baler, which can result in an upward force being applied to the hitch of the tractor and thereby cause instability or damage to the baler's hitch.

SUMMARY OF THE DISCLOSURE

In one embodiment, an agricultural baler having a direction of travel is disclosed. The agricultural baler comprises a baler mechanism and a carriage assembly coupled to the baler mechanism. A platform is coupled to at least one of the baler mechanism and the carriage assembly. The platform is configured to move a bale from the baler mechanism to the carriage assembly and remain tilted until the bale is moved onto the carriage assembly at least substantially out of contact with the platform. A sliding mechanism is coupled to the carriage assembly. The sliding mechanism is configured to move the bale onto the carriage assembly.

In another embodiment, a carriage assembly is disclosed. The carriage assembly is coupled to an agricultural baler mechanism having a direction of travel. The carriage assembly comprises a bale carriage coupled to the baler mechanism and a platform coupled to at least one of the baler mechanism and the bale carriage. The platform is configured to move a bale from the baler mechanism to the bale carriage and remain tilted until the bale is moved onto the bale carriage at least substantially out of contact with the platform.

In yet another embodiment, a method for moving a bale from an agricultural baler to a carriage assembly is disclosed. The carriage assembly is coupled to a baler mechanism having a direction of travel. The method comprises repositioning a platform to move a bale from the baler mechanism to the carriage assembly. The platform is coupled to at least one of the baler mechanism and the carriage assembly.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION OF THE DRAWINGS

Figure 1:
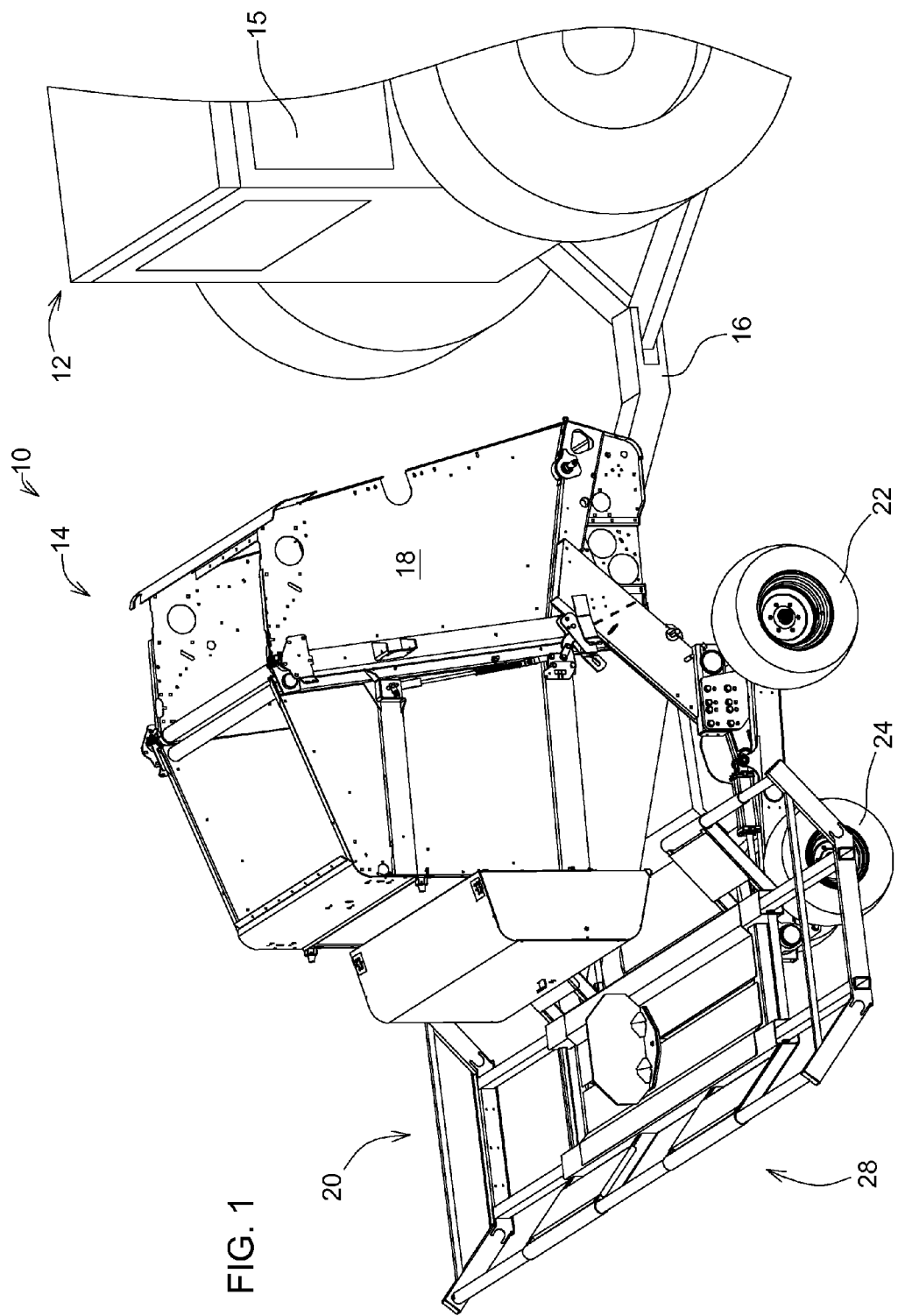
FIG. 1 is a perspective view of a crop harvesting system including one embodiment of a carriage assembly for moving a bale.
Figure 2:
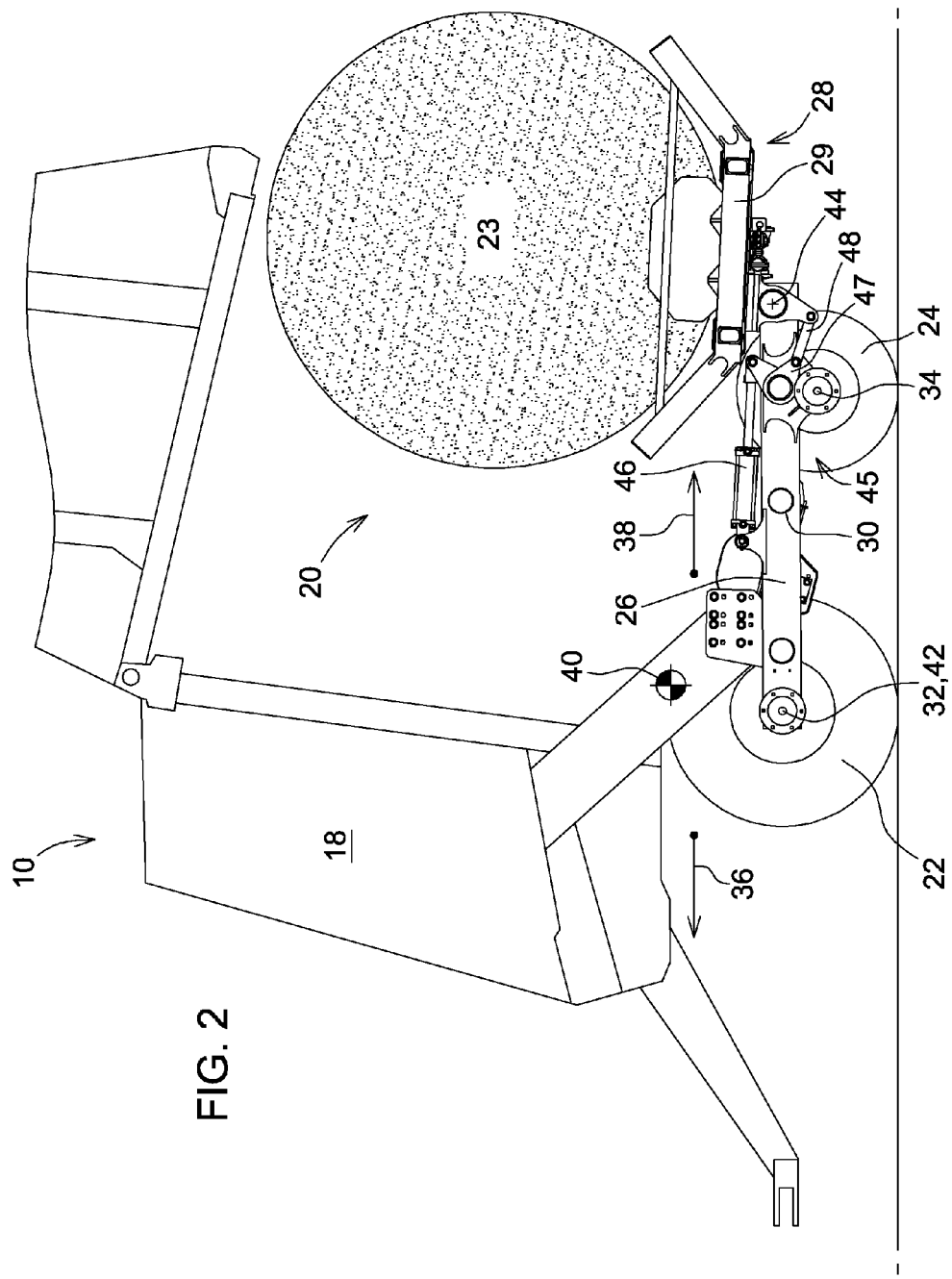
FIG. 2 is a side view of the crop harvesting system of FIG. 1 with some parts removed.

FIG. 1 illustrates a baling system 10 comprising a tractor 12 and a baler 14. The baler 14 is connected to the tractor 12 via a hitch 16 thereby providing towing for the movement of the baler 14. The baler 14 includes a baler mechanism 18, a crop accumulator 20, and at least one ground engaging support 22. With reference to FIG. 2, the baler mechanism 18 receives crop material as the baling system 10 traverses the ground and forms a bale 23 from the crop material.

With continued reference to FIG. 2, the crop accumulator 20 includes at least one ground engaging support 24, structural members 26, and a carriage assembly 28. The carriage assembly 28 includes a bale carriage 29. The ground engaging supports 22, 24 may be in the form of wheels and axles as illustrated or in some other form (e.g., a track system). The structural members 26 may be in the form of a beam and may be referred to as a walking beam construct. The baler mechanism 18 is connected to the structural members 26 at baler connections 30, thereby transferring most of the weight of the baler mechanism 18 to the structural members 26. The structural members 26 are pivotally coupled to the ground engaging support 22 about a pivotal axis 32. The ground engaging support 24 is rotationally coupled to the structural members 26 about a rotational axis 34. The baler connection 30 is shown located between the pivotal axis 32 and the rotational axis 34. The baler connection 30 is a pivoting connection although it is also contemplated that baler connection 30 could also be a non-pivoting connection. It is also contemplated that the baler connection 30 may be located proximate to the pivotal axis 32. The baler connection 30 is located in a fore direction 36 from rotational axis 34 and generally in an aft direction 38 of pivotal axis 32.

The baler 14 is supported primarily by way of the ground engaging supports 22, 24 with the weight of the baler mechanism 18 being transferred to the structural members 26 by way of the baler connection 30. The Center of Gravity ("CG") 40 of the baler mechanism 18 is generally in line with the pivotal axis 32 and the CG 40 will shift as the amount of crop material increases in the baler mechanism 18 and as the baler mechanism 18 discharges a bale 23 onto the bale carriage 29. The structural members 26 function as walking beams with the weight of the baler mechanism 18 used to counteract the weight of the bale(s) 23 on the bale carriage 29. The CG 40 is generally fore of baler connection 30. This arrangement effectively eliminates an upward force being transmitted through the baler connection 30 which thereby eliminates the potential upward force that would occur at the hitch 16 as bales 23 are formed and discharged to the bale carriage 29 and ultimately to the ground if the baler connection 30 were not there.

Although the baler connection 30 is shown apart from the pivotal axis 32, it is also contemplated that the baler connection 30 may be proximate to the pivotal axis 32. Further, the pivotal axis 32 is shown as being coaxial with a rotational axis 42 of the ground engaging support 22. However, it is also contemplated that the pivotal axis 32 may be generally proximate to the rotational axis 42, but not coaxially located.

Figure 12:
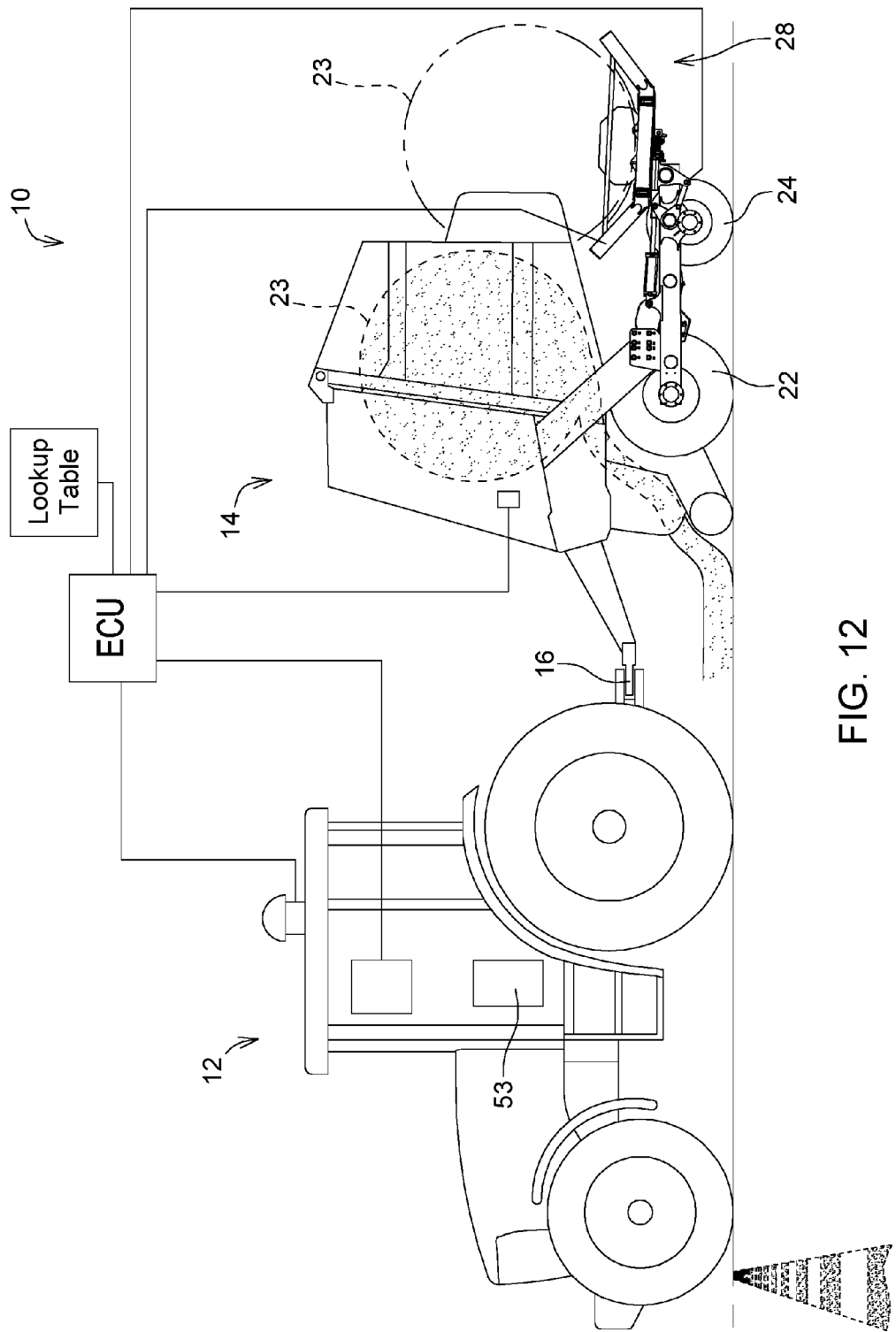
FIG. 12 is a partial schematic side view of the crop harvesting system of FIG. 1.
Figure 13:
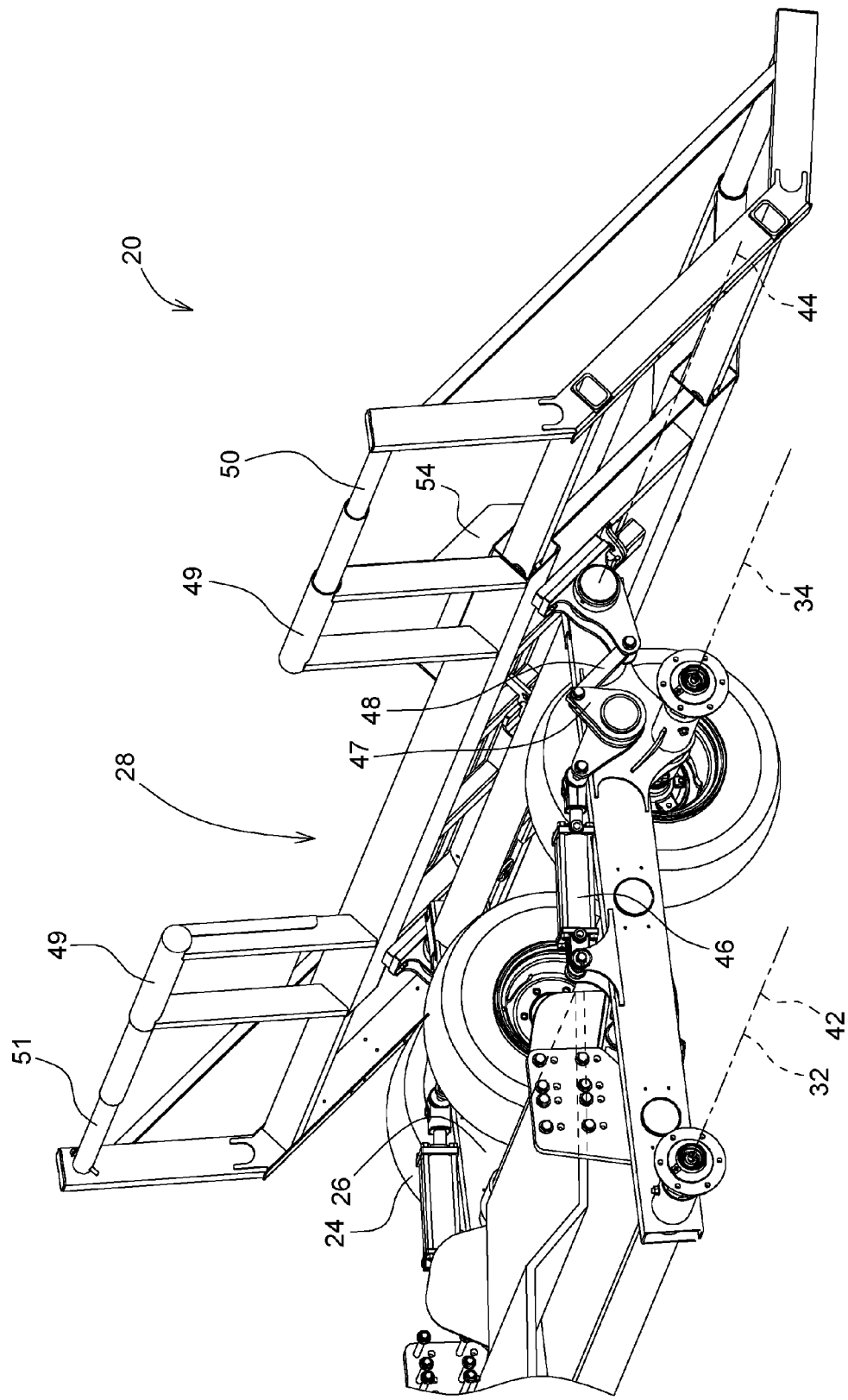
FIG. 13 is a partial perspective view of a crop harvesting system of FIG. 1 with some parts removed.

The bale carriage 29 is pivotally connected to the structural members 26 about a carriage axis 44 to thereby allow the bale carriage 29 to pivot to dump the bales 23 that are carried thereby (FIG. 13). The bale carriage 29 is moved by a movement device 45. The movement device 45 may be controlled by a manually adjustable control 53 (FIG. 12) (e.g., hydraulic control valve) or may be controlled electrically, or pneumatically. The movement device 45 comprises an actuator 46. The actuator 46 may be hydraulic, pneumatic, electric, or other actuator. The actuator 46 is operable to move a pivot arm 47. The pivot arm 47 is operable to move a connector link 48 that is operable to move the bale carriage 29 about the carriage axis 44. Other movement devices 45 are contemplated by this disclosure (e.g., electronic actuator directly connected to the bale carriage 29). The axes 32, 34, 42 and 44 are each shown as substantially parallel to each other and being normal to the view shown in FIG. 2.

Figure 3:
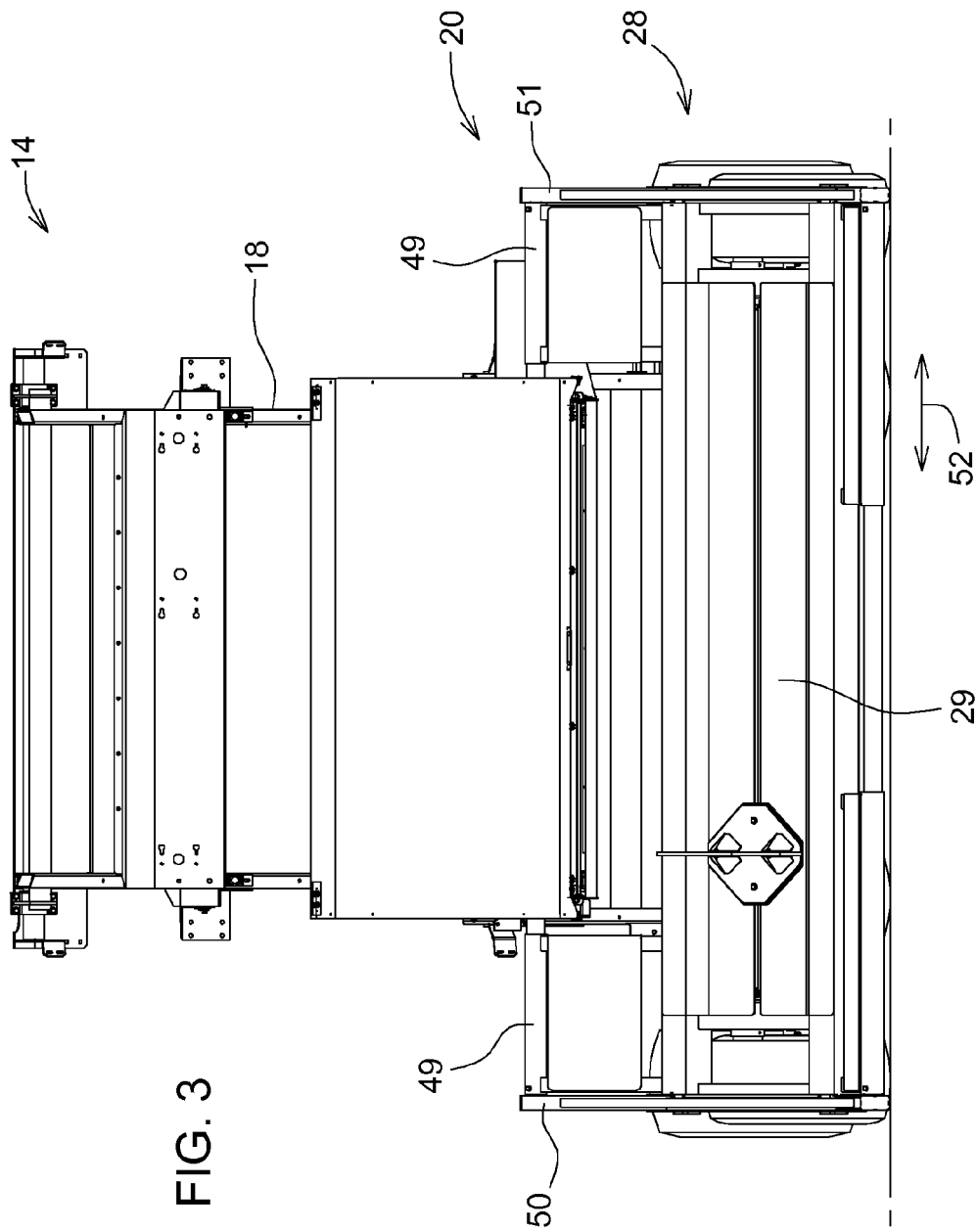
FIG. 3 is a rear view of the crop harvesting system of FIG. 1.

Referring to FIG. 3, there is shown a rear view of the baler 14, with the bale carriage 29 in a retracted mode ready for travel down a road, or prior to any bales 23 being formed and placed on the bale carriage 29. The bale carriage 29 has a fixed section 49 and two extending sections 50, 51, which extend/retract along a direction 52. The direction 52 is substantially normal to the fore direction 36 (FIG. 2), with the fore direction 36 being a travel direction for the baler 14. The extending sections 50, 51 are shown retracted within portions of the fixed section 49. Although it is also contemplated that parts of the extending sections 50, 51 could also envelop portions of the fixed section 49, when in the retracted state. The interaction of the extending sections 50, 51 with the fixed section 49 is such that a telescoping relationship exists as well as a nesting relationship as can be seen in subsequent figures.

Figure 4:
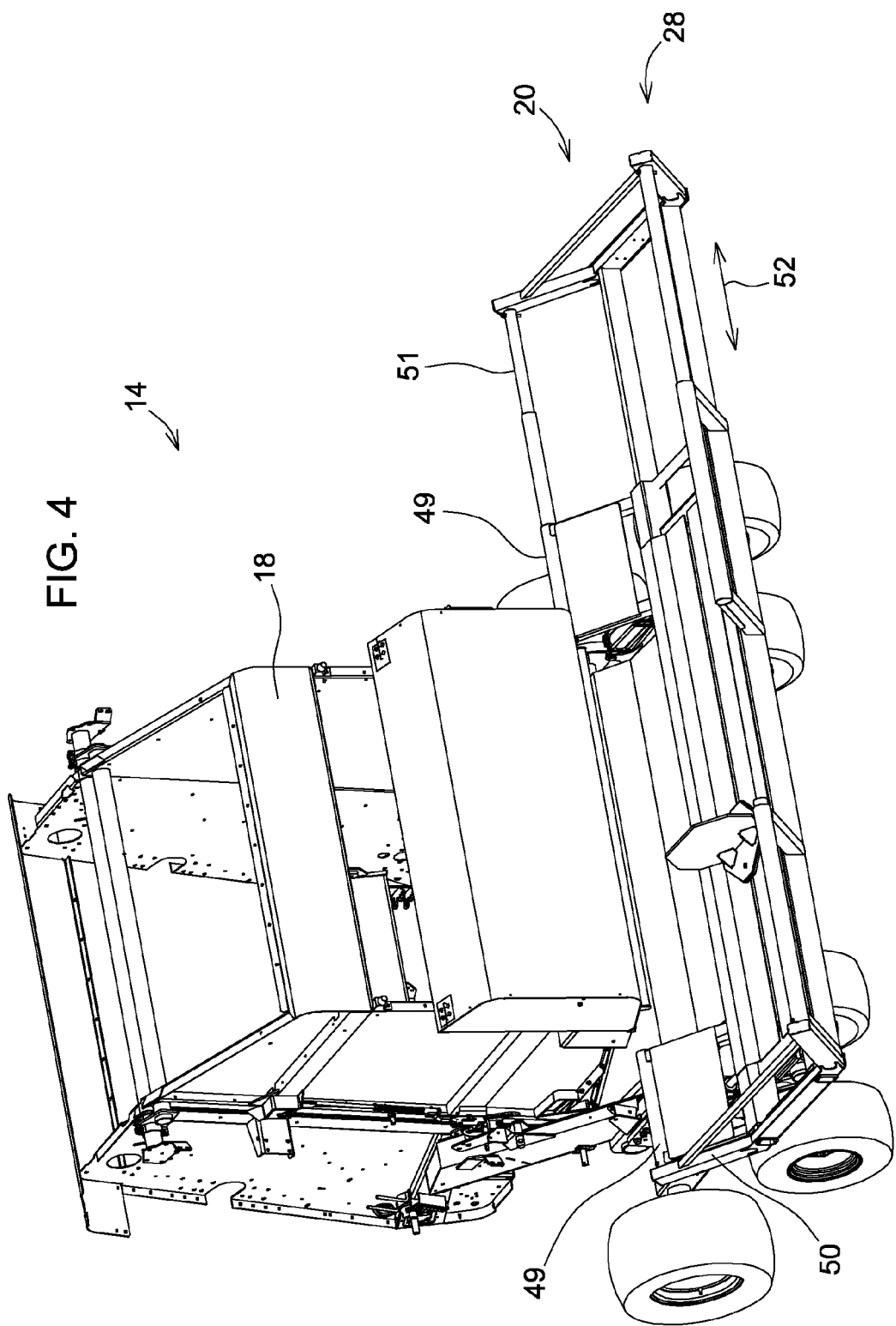
FIG. 4 is a rear perspective view of the crop harvesting system of FIG. 1 showing an extending section in an extended mode.

With reference to FIG. 4, there is shown a view of the baler 14 with the extending section 51 in an extended mode and the extending section 50 in a retracted mode. Although fixed section 49 is referred to as fixed, it nonetheless pivots along with extending sections 50, 51 with the rest of the bale carriage 29 about the carriage axis 44 (FIG. 2).

Figure 5:
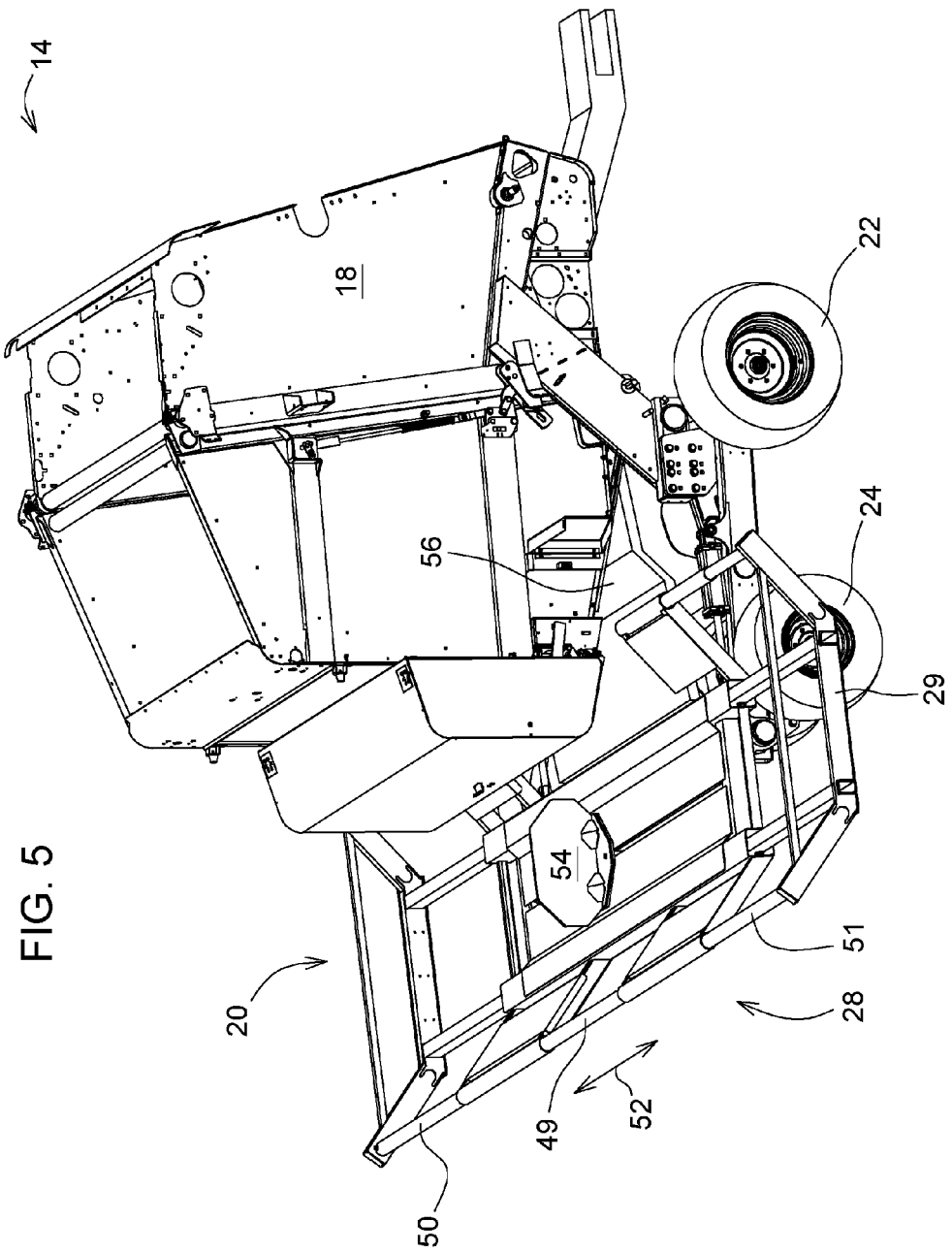
FIG. 5 is a perspective view of the crop harvesting system of FIG. 1.
Figure 10:
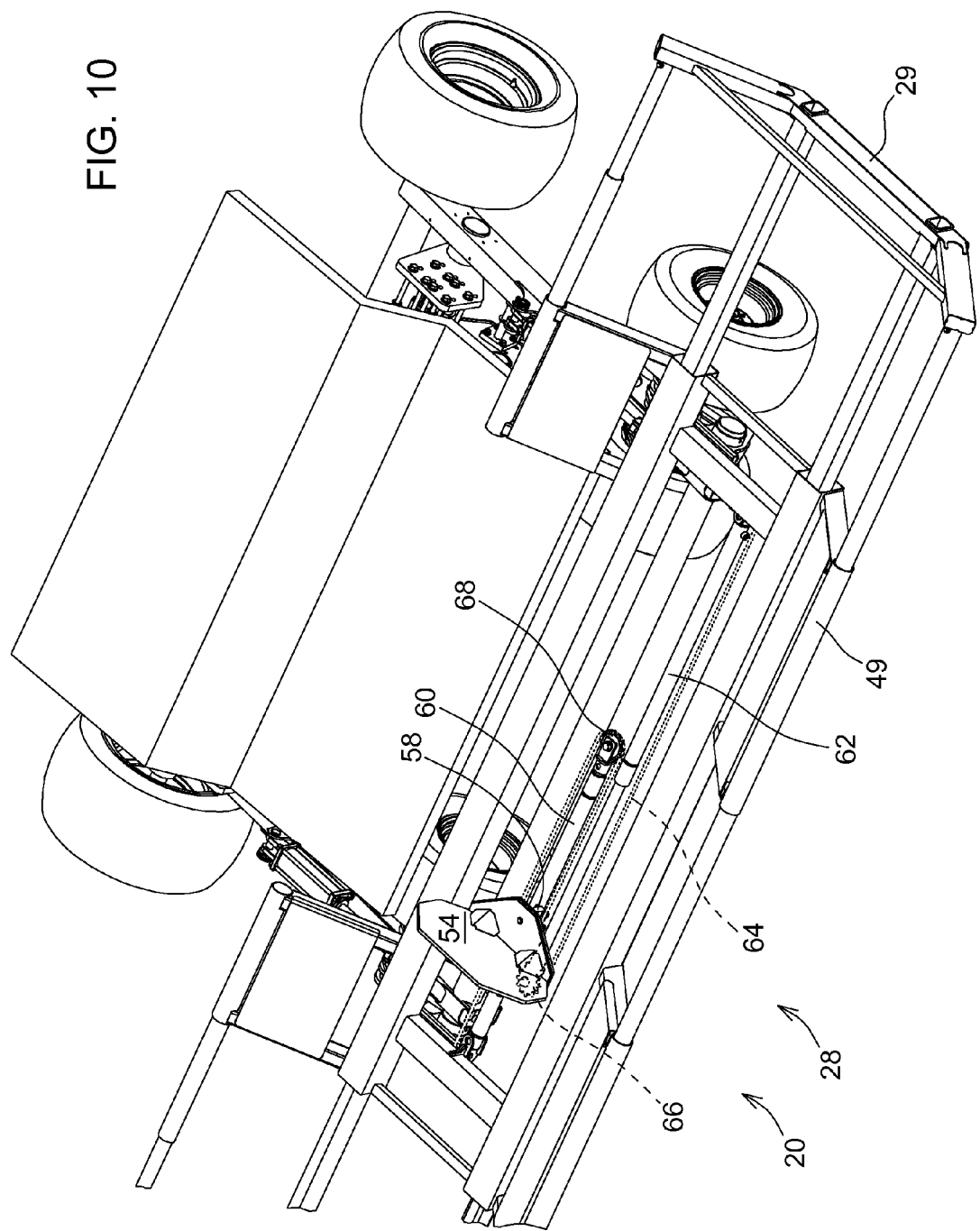
FIG. 10 is a partially-sectioned perspective view of the sliding mechanism of the crop harvesting system of FIG. 1 with the floor of the bale carriage removed.

Referring to FIG. 5 there is shown a bale sliding mechanism 54 and a platform 56. The bale sliding mechanism 54 comprises a pusher 58 (FIG. 10). The bale sliding mechanism 54 is configured to slide a bale 23 along the direction 52. The sliding mechanism 54 is operable to move a bale 23 in the appropriate direction so that the bale 23 ends up substantially supported on either extending section 50, 51.

The control of the sliding mechanism 54 is coordinated with the movement of a bale 23 onto the bale carriage 29 and operates to position a bale 23 on each of extending sections 50, 51.

The platform 56 is situated as being in a substantially flat orientation and is in position for a bale 23 to be dropped thereon by the baler mechanism 18. The platform 56, which can also be thought of as a tilting table, receives a bale 23 and when the back portion of baler mechanism 18 opens, the platform 56 tilts and/or lifts the bale 23 in a generally aft direction 38 (FIG. 2) to move the bale 23 onto the bale carriage 29 as can be seen in some of the subsequent figures.

Figure 6:
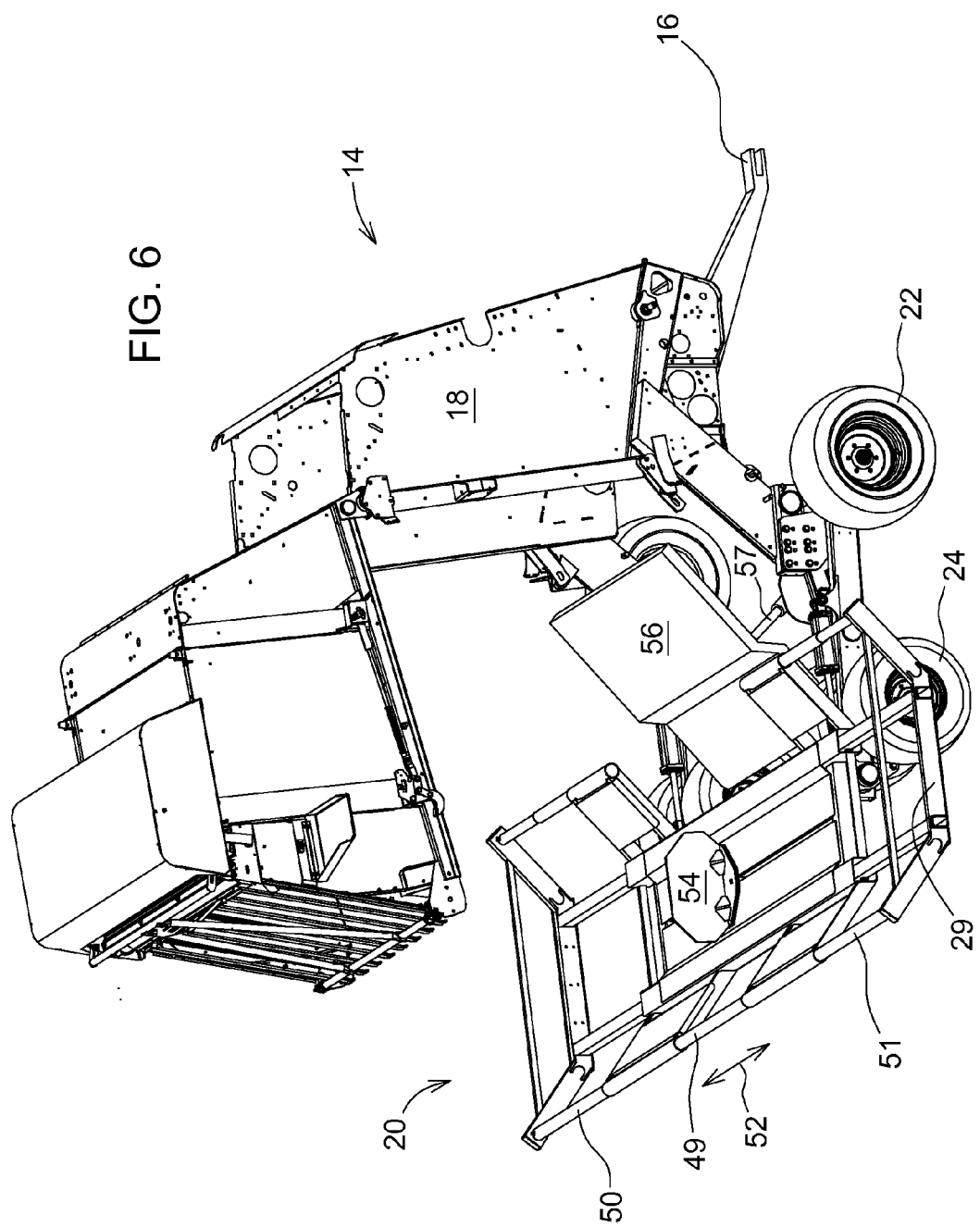
FIG. 6 is another perspective view of the crop harvesting system of FIG. 1 showing the baler mechanism in an open position without a bale.

With reference to FIG. 6 there is shown another view of the sliding mechanism 54 and the platform 56. The platform 56 is shown tilted in a rearward direction and is configured to position a bale 23 so that it can be slid in the direction 52 without the side of the bale 23 getting caught on the fore part of the bale carriage 29. This is accomplished by positioning the platform 56, via the extension of an actuator 57 coupled to and under the platform 56, such that it pushes the bale 23 far enough back so that as the sliding mechanism 54 moves the bale 23, the bale 23 does not initially contact the fore part of the bale carriage 29. This may be considered a type of shingling maneuver so that the bale 23 proceeds along the bale carriage 29 without undue restriction or damage to bale wrap.

Figure 7:
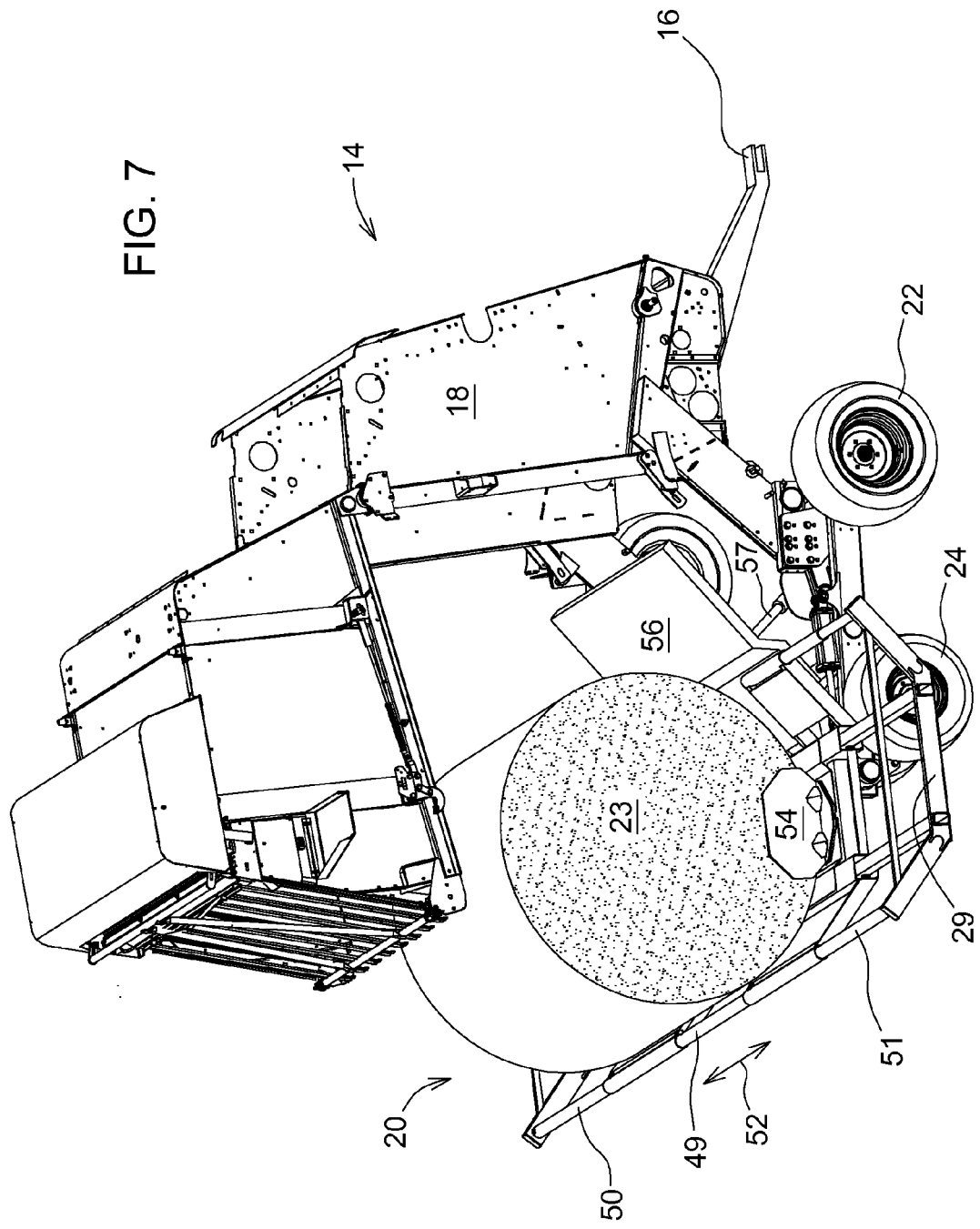
FIG. 7 is another perspective view of the crop harvesting system of FIG. 1 showing a bale being moved.
Figure 8:
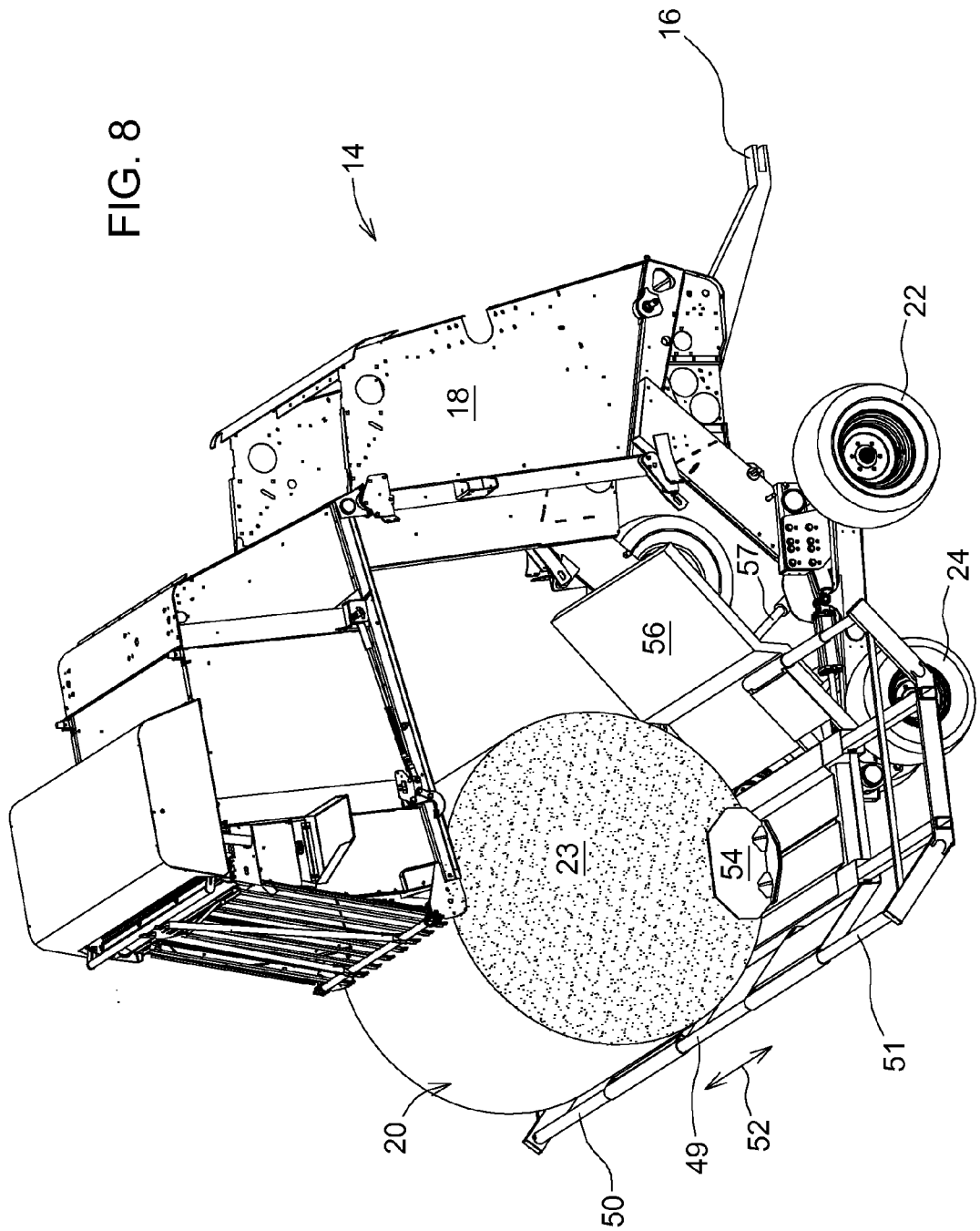
FIG. 8 is another perspective view of the crop harvesting system of FIG. 1 showing a bale being moved further.
Figure 9:
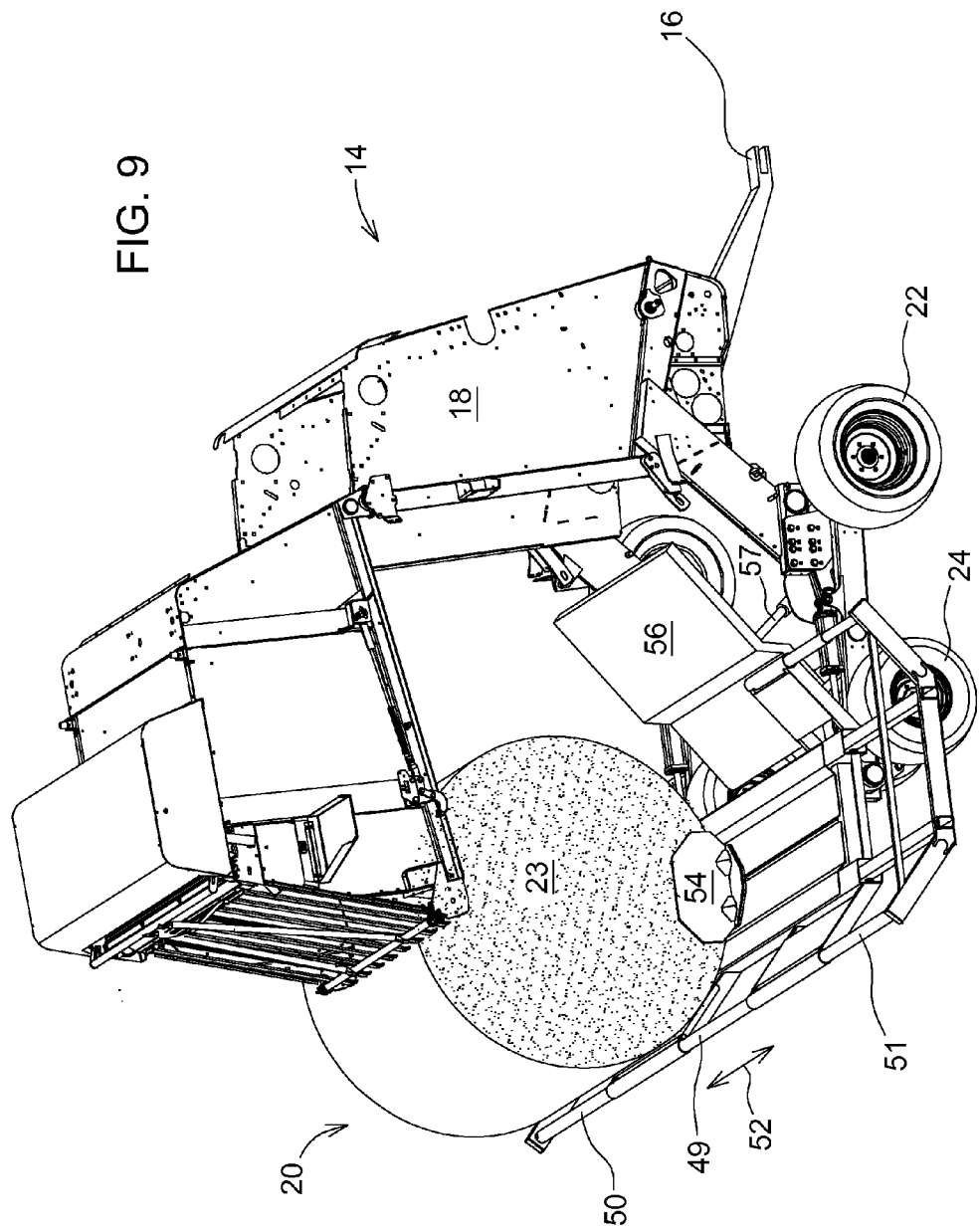
FIG. 9 is another perspective view of the crop harvesting system of FIG. 1 showing a bale being moved completely to the left.

Referring to FIGS. 7-9, there is shown a sequence of positions of the bale 23, as the bale 23 is positioned onto the bale carriage 29 by the platform 56 and moved by the sliding mechanism 54. Once the bale 23 is positioned, as shown in FIG. 9 the rear portion of the baler mechanism 18 is closed and another bale 23 is produced. When the next bale 23 is produced, the sliding mechanism 54 moves the bale 23 onto the extending section 51. When a third bale is produced, the platform 56 moves that bale onto the bale carriage 29 and the bale carriage 29 is then selectively tilted about the carriage axis 44 to dump the bales 23 onto the ground in a singular location for ease of further moving. The dumping of the bales 23 can of course proceed as needed without the need to produce three bales 23. The platform 56 may be configured to move in conjunction with the bale carriage 29 as the bale carriage 29 tilts to ensure that the middle bale is also dumped onto the ground. The platform 56 may be coupled to the bale carriage 29 about a pivoting connection.

Figure 11:
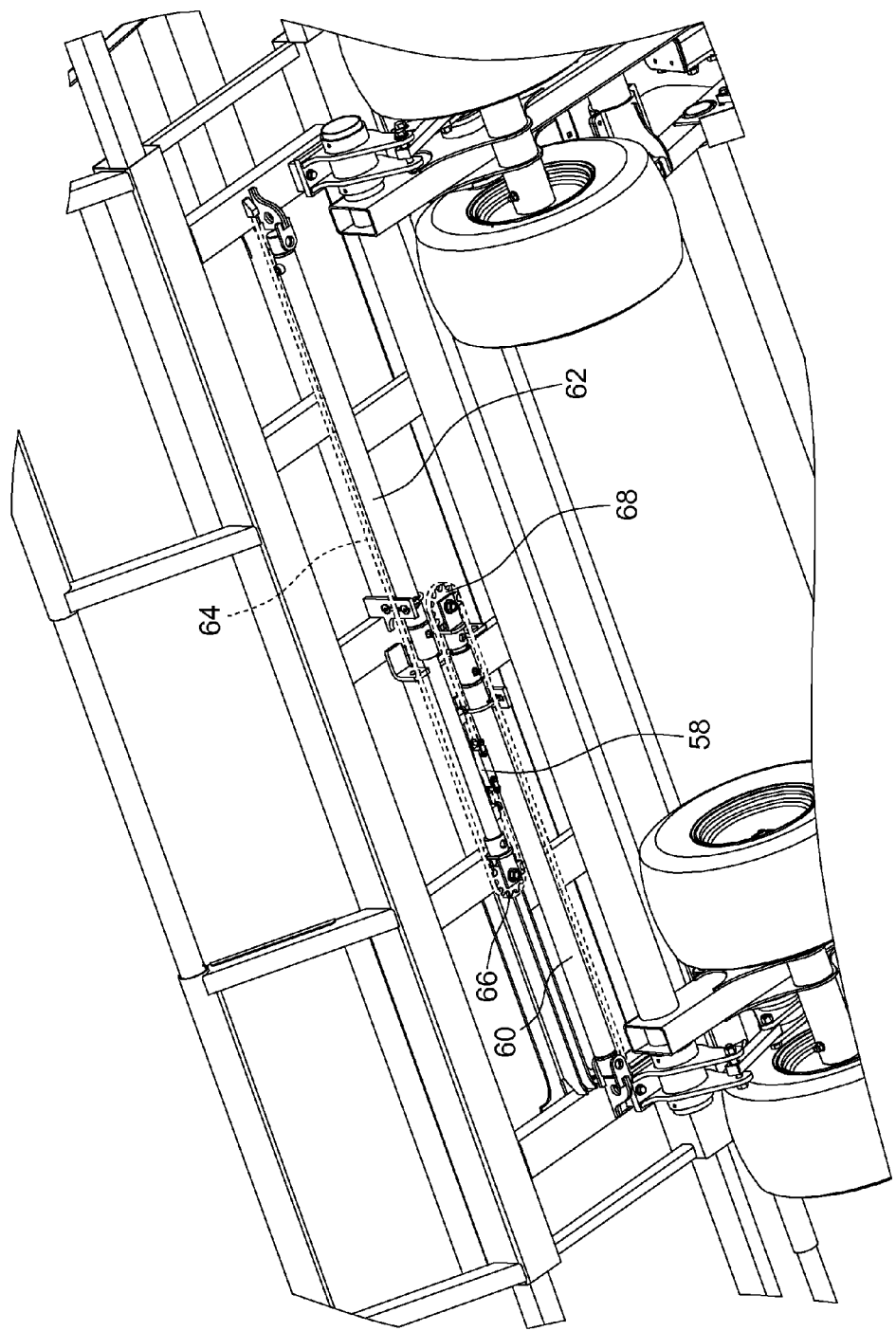
FIG. 11 is a partially-sectioned perspective view from the underside of the baler showing a portion of the sliding mechanism of FIG. 10 with the floor of the bale carriage removed.

With reference to FIGS. 10 and 11, there is shown additional details of the sliding mechanism 54 by way of a partially-sectioned perspective view with the floor of the bale carriage 29 removed. The sliding mechanism 54 includes a pusher 58, movement devices 60, 62, a flexible link 64, and sprockets 66, 68. The movement devices 60, 62 are actuators and are shown here as hydraulic cylinders under the control of a control system (not shown). The flexible link 64 is shown as a chain, which engages the sprockets 66, 68. Ends of the flexible link 64 may be connected to the cylinder portion of the movement devices 60, 62 or to another portion of the bale carriage 29. The extension of the rods of the movement devices 60, 62 are coordinated to keep the flexible link 64 from developing undue slack. As the movement devices 60, 62 move at the same rates, the movement of the pusher 58 moves at a higher pusher speed, and more specifically at twice the speed of the movement of the movement devices 60, 62. This advantageously allows the movement devices 60, 62 to be generally half of the length (in their retracted position) as the distance traveled by the pusher 58.

Advantageously, the present invention can extend the extending sections 50, 51 by the action of the sliding mechanism 54 as the bale 23 is pushed onto either section 50 or section 51. This may be an action that occurs on the first use in a field or sections 50 and 51 may be spring loaded causing them to retract each time the bales 23 are dumped from the bale carriage 29. It is also contemplated that sections 50, 51 may be extended manually or by an actuator (not shown). Additionally, the control system may sense a sideways tilt of the baler 14 causing the bale 23 to be moved to the uphill side of the baler 14 (if that location is empty) to thereby improve stability.

Additionally, the platform 56 positions the bale 23 onto the bale carriage 29 and keeps the bale 23 in position as the bale 23 is either moved to the side by sliding mechanism 54 or if the bale 23 that is leaving the baler mechanism 18 is to be immediately dropped to the ground, then the platform 56 holds a position as the bale carriage 29 pivots to dump the bale 23.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Various features are set forth in the following claims.

What is claimed is:

1. An agricultural baler having a direction of travel, the agricultural baler comprising:
   a baler mechanism;
   a carriage assembly coupled to the baler mechanism;
   a platform coupled to at least one of the baler mechanism and the carriage assembly, the platform configured to move a first bale from the baler mechanism to the carriage assembly and remain tilted until the first bale is moved onto the carriage assembly at least substantially out of contact with the platform;
   a sliding mechanism coupled to the carriage assembly, the sliding mechanism configured to move the first bale in a first direction normal to the direction of travel on the carriage assembly; and
   the platform being configured to move a second bale onto the carriage assembly and the sliding mechanism configured to move the second bale in a second direction opposite the first direction, the platform being configured to move a third bale onto the carriage assembly between the first and second bales creating a full load, the carriage assembly being tiltable separate from the platform, the platform remaining tilted when the carriage assembly has the full load until the carriage assembly is tilted and the full load is discharged from the carriage assembly substantially simultaneously.

2. The agricultural baler of claim 1, wherein the platform is configured to at least one of lift and tilt the first bale.

3. The agricultural baler of claim 2, wherein the platform tilts the first bale in a direction opposite of the direction of travel.

4. The agricultural baler of claim 1, wherein the platform is configured to tilt so as to cause the first bale to roll toward the carriage assembly.

5. The agricultural baler of claim 1, wherein the carriage assembly includes at least one forward side extending in a direction generally normal to the direction of travel, the platform being tiltable so as to move the first bale so that a side of the first bale is at least proximate to the forward side of the carriage assembly.

6. The agricultural baler of claim 1, wherein the platform is configured to tilt and hold the first bale beyond a forward side of the carriage assembly such that the first bale has reduced contact with the forward side while the first bale is slid from the platform.

7. The agricultural baler of claim 1, further comprising an actuator coupled to and under the platform, the actuator extending to tilt the platform.

8. A carriage assembly coupled to an agricultural baler mechanism having a direction of travel, the carriage assembly comprising:
   a bale carriage coupled to the baler mechanism; and
   a platform coupled to at least one of the baler mechanism and the bale carriage, the platform configured to move a first bale from the baler mechanism to the bale carriage and remain tilted until the first bale is moved onto the bale carriage and then moved normal to the direction of travel at least substantially out of contact with the platform, and configured to move a last bale from the baler mechanism to the bale carriage and remain tilted until the last bale is moved onto the bale carriage and the bale carriage is tilted and the first and last bales are discharged from the bale carriage substantially simultaneously.

9. The carriage assembly of claim 8, wherein the platform is configured to at least one of lift and tilt the first bale.

10. The carriage assembly of claim 9, wherein the platform is configured to tilt the first bale in a direction opposite of the direction of travel.

11. The carriage assembly of claim 8, wherein the platform is configured to tilt so as to cause the first bale to roll toward the bale carriage.

12. The carriage assembly of claim 8, wherein the bale carriage includes at least one forward side extending in a direction generally normal to the direction of travel, the platform being tiltable so as to move the first bale so that a side of the bale is at least proximate to the forward side of the bale carriage.

13. The carriage assembly of claim 8, further comprising a sliding mechanism coupled to the bale carriage, the sliding mechanism being configured to move is the first bale onto the bale carriage.

14. The carriage assembly of claim 8, wherein the platform is configured to tilt and hold the first bale beyond a forward side of the bale carriage such that the bale has reduced contact with the forward side while the bale is slid away from the platform.

15. The carriage assembly of claim 8, further comprising an actuator coupled to and under the platform, the actuator extending to tilt the platform.

\* \* \* \* \*